(12) United States Patent
Guo et al.

(10) Patent No.: US 7,636,404 B2
(45) Date of Patent: Dec. 22, 2009

(54) PACKET DETECTION IN THE PRESENCE OF PLATFORM NOISE IN A WIRELESS NETWORK

(75) Inventors: Yongfang Guo, Santa Clara, CA (US); Xintian E. Lin, Mountain View, CA (US); Qinghua Li, Sunnyvale, CA (US); Stanley K Ling, Rocklin, CA (US); Jorge Myszne, Zikhron Ya'akov (IL); David Carasso, Haifa (IL)

(73) Assignee: Intel Corporation, Santa Clara, CA (US)

( * ) Notice: Subject to any disclaimer, the term of this patent is extended or adjusted under 35 U.S.C. 154(b) by 672 days.

(21) Appl. No.: 11/322,829

(22) Filed: Dec. 30, 2005

(65) Prior Publication Data

US 2007/0116158 A1 May 24, 2007

Related U.S. Application Data

(60) Provisional application No. 60/738,699, filed on Nov. 21, 2005.

(51) Int. Cl.
*H03D 1/00* (2006.01)
(52) U.S. Cl. ........................................ 375/343; 375/317

(58) Field of Classification Search ............... 708/5, 708/422, 425, 426, 671; 375/143, 150, 346, 375/343; 370/253, 349, 433, 342, 320
See application file for complete search history.

(56) References Cited

U.S. PATENT DOCUMENTS

| 5,854,950 | A | * | 12/1998 | Handa et al. | ............... | 396/310 |
| 6,381,570 | B2 | * | 4/2002 | Li et al. | ................... | 704/233 |
| 2002/0168034 | A1 | * | 11/2002 | Yang et al. | ................ | 375/342 |
| 2005/0020292 | A1 | * | 1/2005 | Kim | ........................ | 455/515 |
| 2007/0019773 | A1 | * | 1/2007 | Zhou | ........................ | 375/373 |
| 2007/0049229 | A1 | * | 3/2007 | Finkelstein et al. | ........ | 455/270 |

\* cited by examiner

*Primary Examiner*—David C Payne
*Assistant Examiner*—Rahel Guarino
(74) *Attorney, Agent, or Firm*—The Law Offices of John C. Scott, LLC; John C. Scott

(57) ABSTRACT

Techniques are presented for improving packet detection within a wireless device in the presence of platform noise. In some embodiments, packet detection is carried out by first performing a correlation operation using a signal at an input of a wireless receiver. The result of the correlation may then be compared to a threshold value in order to make a packet arrival decision. The threshold value may be varied during device operation in a manner that enhances packet detection performance.

30 Claims, 8 Drawing Sheets

PACKET DETECTION IN THE PRESENCE OF PLATFORM NOISE IN A WIRELESS NETWORK

This application claims the benefit of U.S. Provisional Application No. 60/738,699 filed on Nov. 21, 2005.

TECHNICAL FIELD

The invention relates generally to wireless communication and, more particularly, to wireless networking.

BACKGROUND OF THE INVENTION

In some wireless networking schemes, data is communicated using packets that are transmitted in a random access fashion through a wireless channel. The receiver in such an arrangement does not know when a packet will be received and must therefore monitor the wireless channel and attempt to detect a packet when it arrives. Packet detection may be performed by correlating an input signal of the receiver with another signal to generate a correlation coefficient. The input signal may be cross-correlated with a pattern known to be within a header of each packet or auto-correlated with itself to generate the correlation coefficient. Once the correlation coefficient has been generated, it may be compared to a fixed threshold value to determine whether a packet has arrived. It is assumed that a packet has arrived if the correlation coefficient is greater than the fixed threshold value.

In the past, it was often assumed that the only form of noise present at the input of a radio frequency (RF) receiver in a wireless device was white Gaussian noise. White Gaussian noise is a random, uncorrelated form of noise that has little to no effect on the correlation coefficient that is generated by the receiver during packet detection operations. Investigation has shown, however, that other forms of noise may also be present at the input of a receiver within a wireless device that tends to increase correlation coefficients. One such noise type will be referred to herein as platform noise. Platform noise is noise that is generated within the platform itself. The source of such noise is typically the various clocks (e.g., an LCD pixel clock, a PCI express phase locked loop (PLL) clock, etc.) and other signal generating components within the platform. Unlike white Gaussian noise, it has been observed that the temporal correlation of platform noise is typically high. Therefore, the platform noise may not have a negligible effect on the correlation calculation performed during packet detection operations.

If platform noise alone results in a correlation coefficient that is higher than the fixed threshold value used by a receiver, then the receiver will improperly indicate that a packet has been detected. This situation is known as a false alarm. When a false alarm occurs, further receiver processing may be performed before it is realized that the detection was a false alarm. After this is realized, the receiver state may be reset to acquisition mode. If an actual packet is received before the receiver state is reset, the packet may not be detected by the receiver. The missed packet will then have to be retransmitted, resulting in a reduction in throughput in the network. It is desirable that receiver techniques be developed that are capable of increasing a packet detection rate in a wireless network receiver.

DETAILED DESCRIPTION

Figure 1:
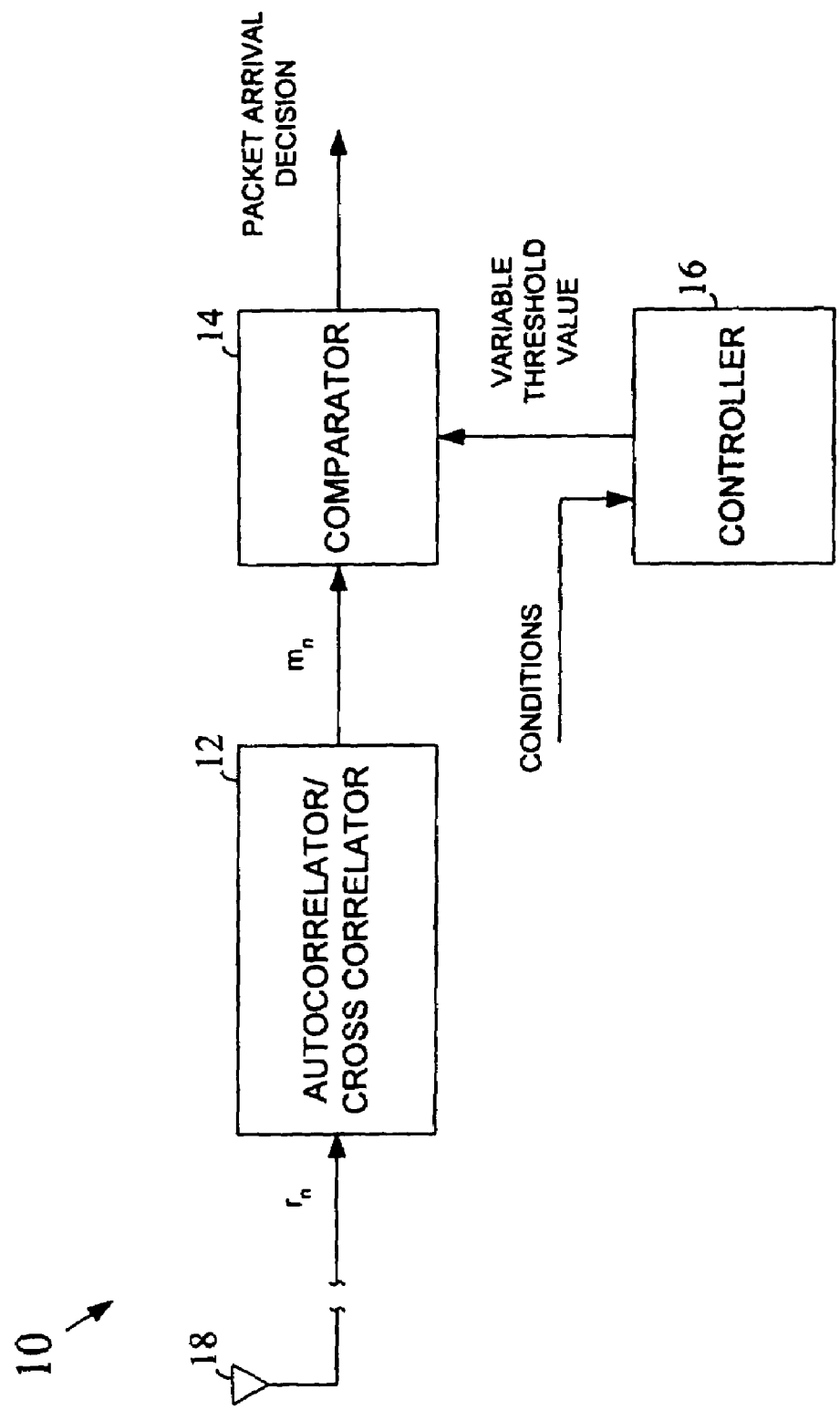
FIG. 1 is a block diagram illustrating example packet detection functionality in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention relates to techniques and structures that are capable of improving packet detection in wireless network receivers in the presence of platform noise. Instead of using a fixed threshold value during packet detection operations, the threshold may be varied in a manner that reduces a false alarm rate or a combination of false alarm rate and missed packet rate. In this manner, false alarms and/or missed packets caused by platform noise may be reduced significantly. In some embodiments, a balance is reached between false alarms and missed packet detections. The invention is capable of producing a significant increase in throughput in a wireless network.

FIG. 1 is a block diagram illustrating example packet detection functionality 10 in accordance with an embodiment of the present invention. The packet detection functionality 10 may be used within a receiver in, for example, a wireless device, component, or subsystem in a wireless network. As shown, the packet detection functionality 10 may include: a correlator 12, a comparator 14, and a controller 16. The correlator 12 is coupled to process wireless signals received from a wireless channel by one or more antennas 18. Any type of antenna(s) may be used including, for example, a dipole, a patch, a helical antenna, and antenna array, and/or others. The correlator 12 performs a correlation operation using an input signal $r_n$ as a first step in determining whether a wireless packet has been received from the wireless channel. The correlator 12 may perform an auto-correlation operation, where the input signal is correlated with a delayed version of itself, or a cross-correlation operation, where the input signal is correlated with a known data pattern. If no packet has been received, there is typically only noise at the input of the correlator 12. Packets that are transmitted in the wireless network may include a known data pattern in a header portion thereof that is specifically designed for use in packet detection (e.g., the short preamble in an IEEE 802.11 packet, etc.).

The correlation operation performed by the correlator 12 results in a correlation coefficient, $m_n$. The magnitude of the correlation coefficient is related to the degree of correlation between the input energy and the delayed version thereof (or the known data pattern for cross correlation). The comparator 14 compares the correlation coefficient to a threshold value to determine whether a packet has arrived at the receiver. If the correlation coefficient is greater than the threshold value, it may be assumed that a packet has been received. If the correlation coefficient is not greater than the threshold value, it may be assumed that a packet has not been received. The correlation and comparison process may be continuously repeated during receiver operation to detect packets within the wireless channel.

In one implementation, the correlator 12 may perform a delayed autocorrelation. This autocorrelation function may be expressed as follows:

$$C_n = \sum_{k=0}^{L-1} r_{n+k} r^*_{n+k+D}$$

$$P_n = \sum_{k=0}^{L-1} r_{n+k+D} r^*_{n+k+D} = \sum_{k=0}^{L-1} |r_{n+k+D}|^2$$

$$m_n = |C_n / P_n|.$$

where $C_n$ is the empirical autocorrelation of a received signal $r_n$ using a sliding window of size L and a delay lag D; $P_n$ is the average received power in the window; and $m_n$ is the empirical correlation coefficient (i.e. the normalized autocorrelation). In an IEEE 802.11a/g based network, D=0.8 microseconds and L=N*D, where N is typically 1, 2, or 3. Once a packet arrives, $C_n$ is the delayed autocorrelation of the short preamble training symbols of the packet, which causes $m_n$ to jump quickly to its maximum value (close to 1). The correlation coefficient may then be compared to the threshold value to provide an accurate indication of the start of the packet. Other correlation techniques (e.g., cross correlation, etc.) and packet detection techniques may alternatively be used.

Figure 2:
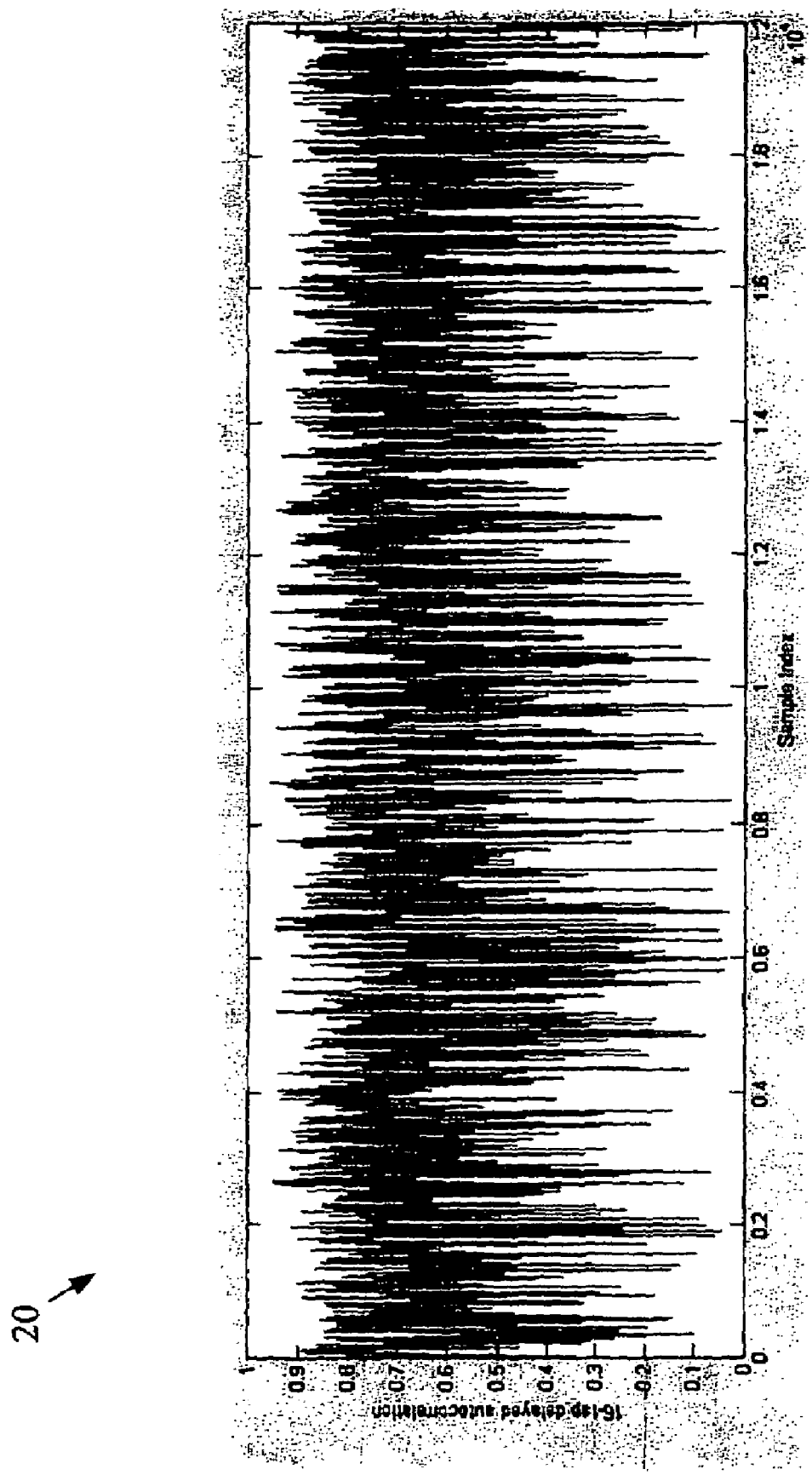
FIG. 2 is a graph illustrating a 16-tap delayed autocorrelation generated within a receiver in the presence of platform noise in a wireless network.

In systems of the past, the threshold value used to test the correlation coefficient was a fixed value. In such systems, it was typically assumed that any noise at the input of the correlator 12 was white Gaussian noise, which is a zero mean random variable. This white Gaussian noise has little to no effect on the magnitude of the correlation coefficient generated by the correlator 12 and, therefore, does not have a significant impact on the packet detection decision. It has been determined, however, that platform noise may also be present at the input of the correlator 12 in many wireless devices that may display a much higher level of correlation than white Gaussian noise. This platform noise may therefore increase the magnitude of the correlation coefficient output by the correlator 12 and compromise the accuracy of the packet detection decision. FIG. 2 is a graph illustrating a 16-tap delayed autocorrelation 20 generated within a receiver in the presence of platform noise in a wireless network in one implementation. As shown, this autocorrelation includes peak values that approach a value of 1. On occasion, even when no packet has been received by a receiver, the correlation coefficient output by the correlator 12 may be greater than the threshold value and thus be incorrectly identified as a received packet. This occurrence is refereed to as a "false alarm." When the arrival of a packet is detected, the receiver typically attempts to synchronize to the packet and to estimate a frequency offset of the packet. If a false alarm has occurred, there will be no packet to synchronize to. In such a scenario, it will typically take a certain amount of time (i.e., a recovery time) for the receiver to determine that a packet has not arrived. In at least one implementation, this recovery time is around 30 microseconds (although the amount will vary from implementation to implementation). If any packets arrive at the receiver during the recovery period, the packets will not be detected by the receiver. As will be appreciated, this will result in a reduction in throughput within the network. Therefore, in one aspect of the present invention, a threshold value is selected that will reduce the occurrence of false alarms in a network receiver.

If the threshold value used by a receiver is made too high, then some of the packets that are received by the receiver may not be detected. For example, one or more received packets may result in a correlation coefficient that is lower than the threshold value being used. These undetected packets will be referred to herein as missed packets and will result in a reduction in throughput in the network. In one aspect of the present invention, the rate of missed packets in the network may also be considered in determining a threshold value.

The controller 16 in FIG. 1 is operative for generating the threshold value to be used by the comparator 14. In one aspect of the present invention, the threshold value generated by the controller 16 varies with time based on one or more changing conditions in the network or the platform associated with the packet detection functionality 10. The controller 16 may detect or receive information on changes in one or more conditions and proceed to change the threshold value used by the comparator 14. In one embodiment, the controller 16 may identify a threshold value that is designed to achieve a target false alarm rate within the receiver. In another approach, the controller 16 may determine a threshold value taking both false alarm rate and missed detection rate into account. The controller functionality may be implemented, at least in part, within one or more digital processing devices within the corresponding platform. The digital processing device may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. The correlation function and/or the comparison function may be performed in the same or a different digital processing device as the controller function. Analog implementations and hybrid analog/digital implementations may alternatively be used.

Figure 3:
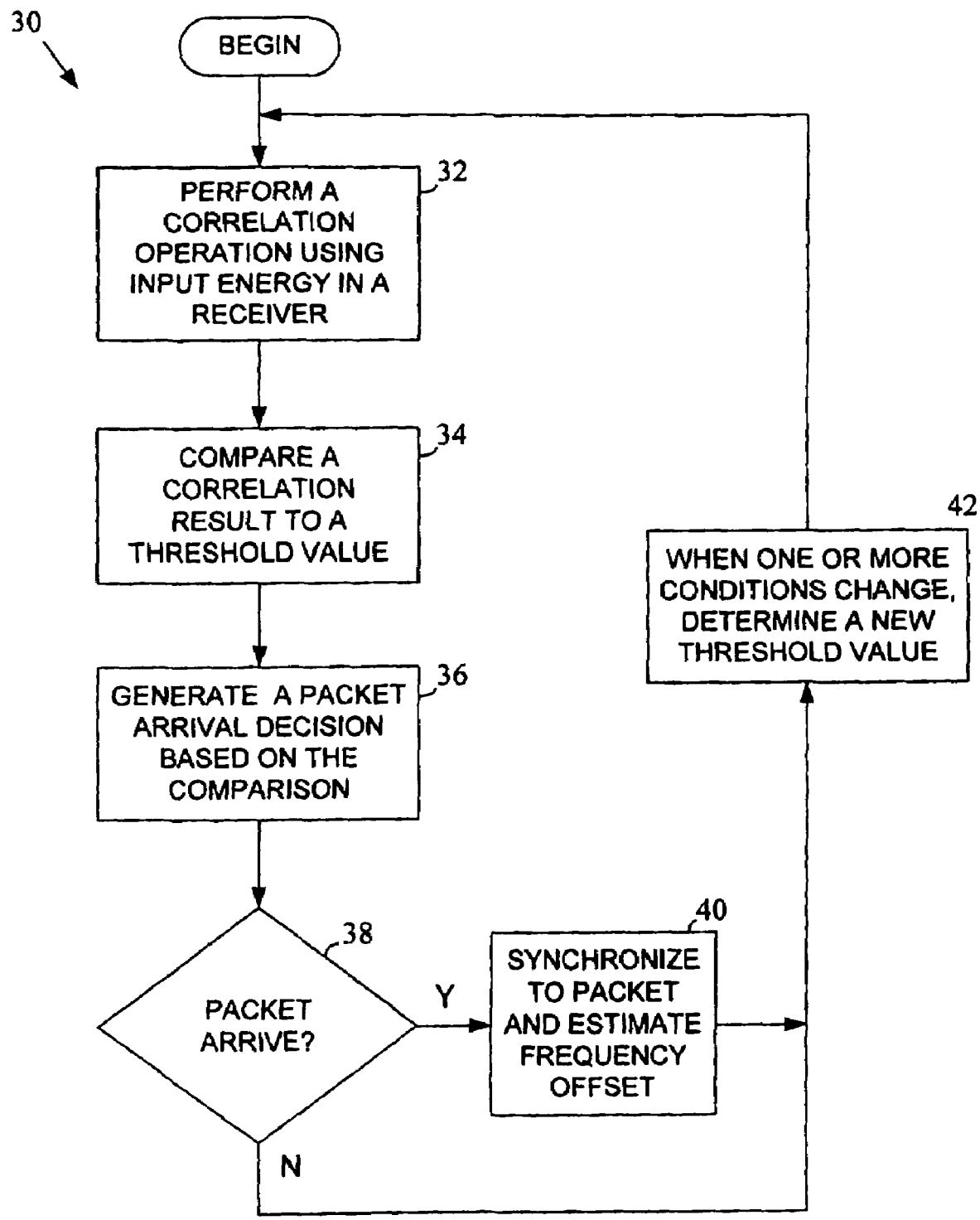
FIG. 3 is a flowchart illustrating an example method for use in performing packet detection in a wireless network in accordance with an embodiment of the present invention.

FIG. 3 is a flowchart illustrating an example method 30 for use in performing packet detection in a wireless network in accordance with an embodiment of the present invention. The method 30 may be implemented within the packet detection functionality 10 of FIG. 1 or in other wireless networking receiver arrangements. A correlation operation is first performed using input energy in a wireless receiver (block 32). The correlation operation may be an auto-correlation and/or a cross correlation. The correlation operation generates a correlation result that is a measure of the correlation between the signals being processed. The correlation result (e.g., a correlation coefficient, etc.) is compared to a threshold value (block 34). A packet arrival decision may then be generated based upon the result of the comparison (block 36). If the packet arrival decision indicates that a packet has arrived (block 38-Y), the receiver synchronizes to the packet and estimates a frequency offset of the packet (block 40). It may next be determined whether one or more conditions have changed in the wireless receiver environment that may impact the effectiveness of the threshold value currently being used. If so, a new threshold value is determined for use in subsequent packet detection operations. The new threshold value may be determined in a manner that reduces either the false alarm rate or some combination of the false alarm rate and the missed packet rate. In another approach, updated threshold values may be generated periodically or at predefined times without having to first detect a condition.

If the packet arrival decision indicates that a packet has not arrived (block 38-N), the method 30 may proceed directly to block 42. The method 30 then repeats. The method 30 may repeat continuously during receiver operation so that packets may be detected in an efficient manner. In at least one embodiment, new threshold values may be selected/determined during idle periods (e.g., SIFS in an IEEE 802.11 network, etc.) in the corresponding wireless network.

The packet detection rate in a network receiver is the rate at which packets are successfully received. This rate directly impacts the throughput achieved in the corresponding wireless channel. The packet detection rate may be calculated as follows. First, two key probability quantities may be defined for a binary test (i.e., false alarm probability and missed detection probability). By applying the theory of the binary hypothesis test, the following two hypotheses are developed:

$H_0:r=n$; the packet is not present $H_1:r=hx+n$; the packet is present

The prior probability of $H_0$ and $H_1$ occurring may be denoted by $P_0=\text{prob}(H_0)$ and $P_1=\text{prob}(H_1)$, respectively. The false alarm probability ($P_F$) and the missed detection probability ($P_M$) may be expressed as follows:

$P_F=\text{prob}(\text{say}H_1|H_0 \text{ is true})=\text{prob}(\text{the delayed autocorrelation}>Th|H_0)$ $P_M=\text{prob}(\text{say}H_0|H_1 \text{ is true})=\text{prob}(\text{the delayed autocorrelation}<Th|H_1)$ where Th is the current threshold value. It should be appreciated that metrics other than delayed autocorrelation can also be used to detect the packet. The risk of false alarm and missed detection may be expressed as:

$R=C_{01}P_0P_F+C_{10}P_1P_M$ where $C_{01}$, and $C_{10}$ denote the costs of false alarm and missed detection, respectively (i.e., the data loss perceived in throughput or range). In at least one embodiment of the invention, the objective function minimizes the risk R of false alarm and missed detection by appropriately selecting the threshold value Th. This objective function may be expressed as:

$$\min_{Th} R = C_{01}P_0P_F + C_{10}P_1P_M$$

In the above objective function, the prior probabilities $P_0$ and $P_1$ may be predetermined according to the network traffic. For example, if $T_1$ is the average time during which the wireless medium is busy and $T_0$ is average time the wireless medium is idle, then:

$P_1=T_1/(T_1+T_0)$, and $P_0=T_0/(T_1+T_0)$.

The cost of false alarm and missed detection ($C_{01}$ and $C_{10}$) can be determined based on the impact of false alarm and missed detection on data loss. In general, a false alarm will be less severe on data loss than a missed detection. As described previously, after a false alarm, it will typically take the receiver a certain period of time (recovery period) to determine that a false alarm has occurred. As long as no packet arrives during this recovery period, the false alarm will not result in data loss. On the other hand, if a missed detection occurs, there is always a packet lost. The cost of a missed detection may therefore be taken as 1 (i.e., the packet is lost with probability 1). Correspondingly, the cost of a false alarm will be less than or equal to one. More specifically, the cost of a false alarm is equal to the probability of a packet loss when a false alarm happens, which depends on the network traffic. For example, when traffic is heavy, all of the false alarms may result in data loss (i.e., $C_{01}=1$). When traffic is light, on the other hand, only half of the false alarms may result in data loss ($C_{01}=0.5$), and so on.

Figure 4:
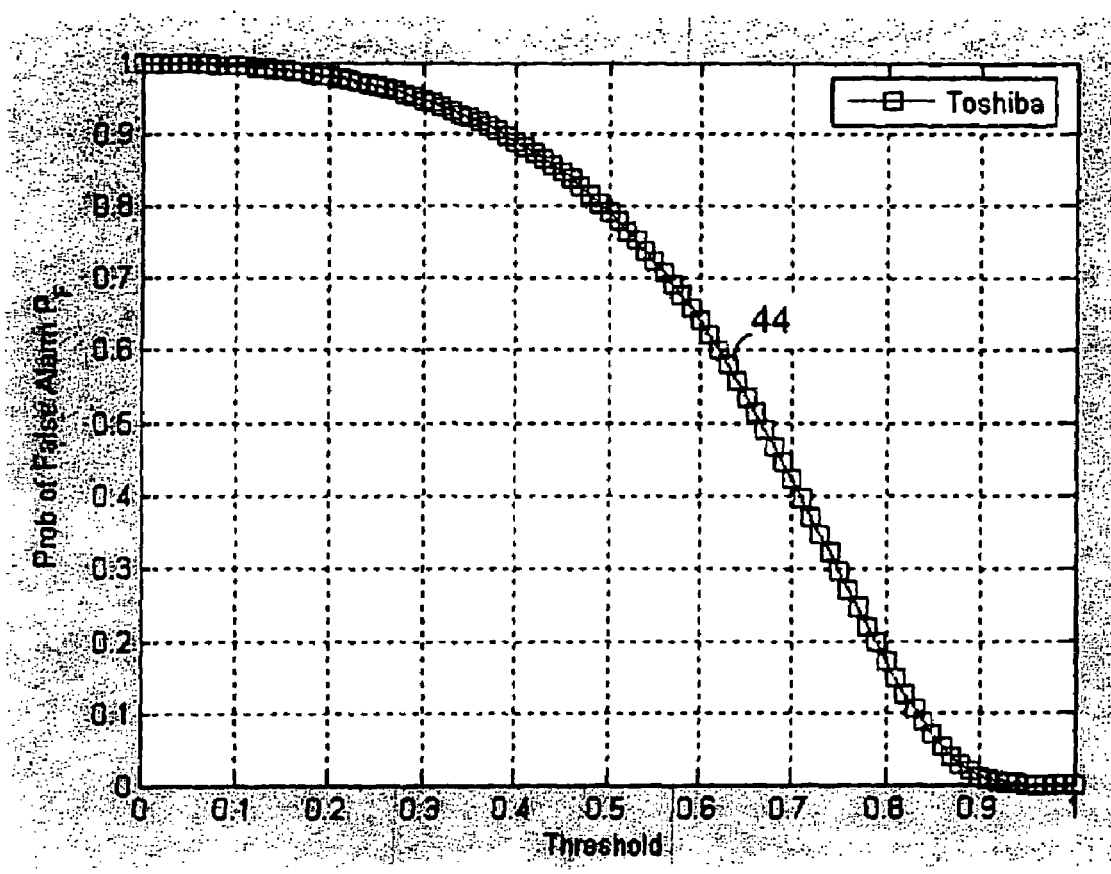
FIG. 4 is a graph illustrating an example plot of false alarm probability versus threshold for a laptop computer in accordance with an embodiment of the present invention.

The prior probabilities $P_0$ and $P_1$ and the cost factors of false alarm and missed detection ($C_{01}$ and $C_{10}$) can be predetermined based on network usage and traffic from the medium access control (MAC) layer. Thus, evaluation of the risk function with respect to the threshold Th will primarily involve a determination of the probability of false alarm $P_F$ and the probability of missed detection $P_M$. The false alarm probability may be determined from the characteristics of the platform noise. Because of the high self-correlation property of the platform noise, a higher threshold will typically result in a lower probability of false alarm. The missed detection probability may be determined using, for example, the signal-to-noise ratio (SNR), the channel characteristics, and the platform noise characteristics. As a conflict function, a higher threshold will typically result in a higher missed detection probability. It can be difficult to express $P_F$ and $P_M$ in closed form, so values of $P_F$ and $P_M$ may be developed numerically. The probability $P_F$ of false alarm with respect to the threshold may be pre-calculated due to the static nature of the platform noise. FIG. 4 is a graph illustrating an example plot 44 of $P_F$ versus threshold for a Toshiba Tecra M3 laptop computer operating on channel 10. As FIG. 4 illustrates, the probability $P_F$ decreases as the threshold value increases.

Figure 5:
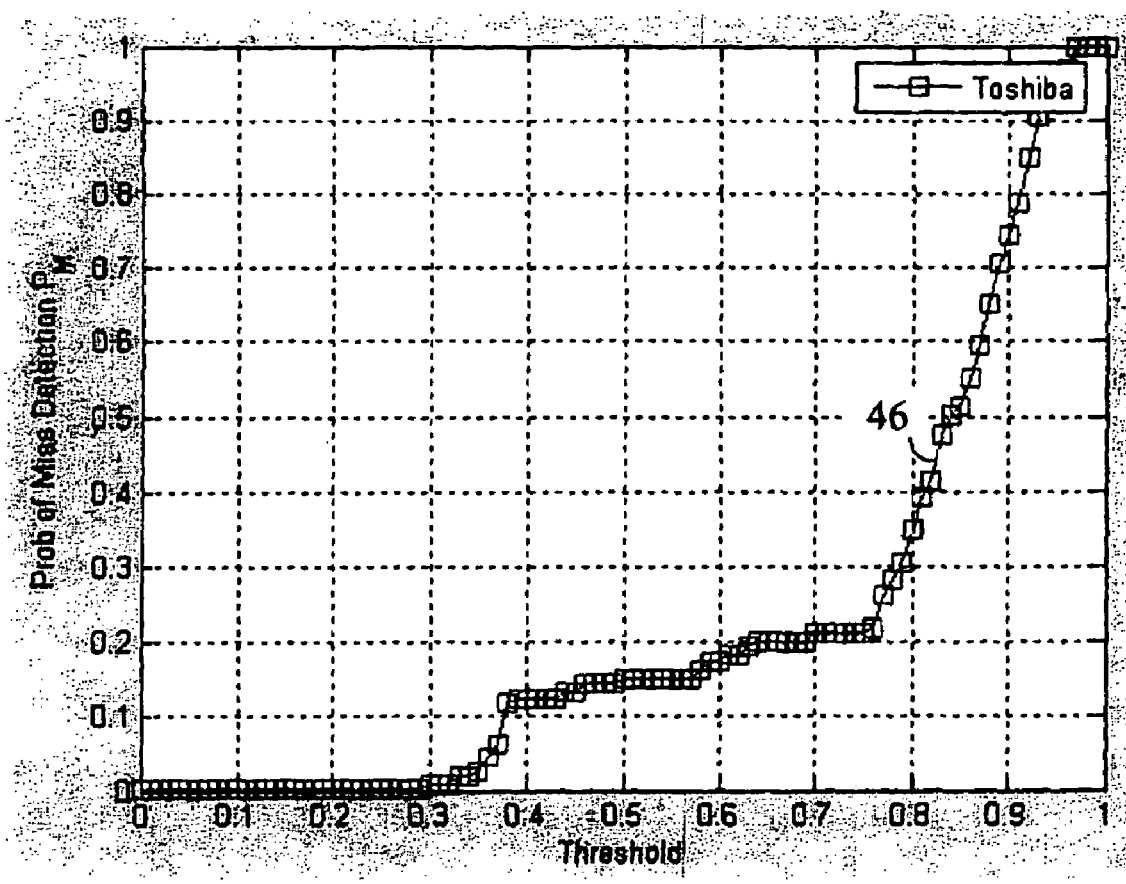
FIG. 5 is a graph illustrating an example plot missed detection probability versus threshold for a laptop computer in accordance with an embodiment of the present invention.
Figure 6:
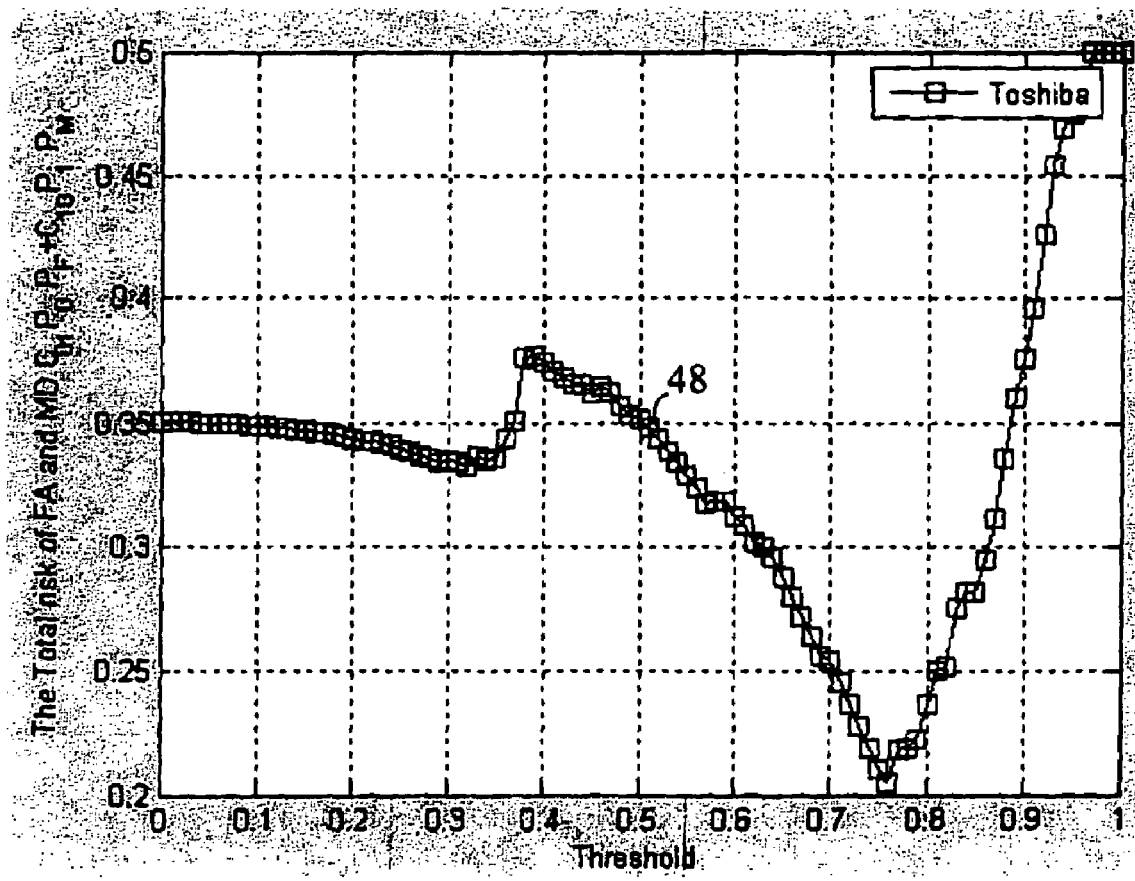
FIG. 6 is a graph illustrating an example plot of the total risk of false alarm and missed detection for a laptop computer in the presence of platform noise under predetermined conditions in accordance with an embodiment of the present invention.

The probability of missed detection $P_M$ is not only dependent on the threshold value, but also on the SNR and channel conditions within the network. FIG. 5 is a graph illustrating an example plot 46 of $P_M$ versus threshold for a Toshiba Tecra M3 laptop computer operating at an SNR of 20 dB in a 75 ns exponential decay channel. Referring to FIGS. 4 and 5, it is easy to see that minimizing $P_F$ and $P_M$ are two conflicting objectives (i.e., increasing the threshold decreases the false alarm probability while increasing the missed detection probability). In at least one embodiment of the invention, a threshold value is determined that balances the two objectives by numerically minimizing the sum of the risk of false alarm and missed detection. FIG. 6 is a graph illustrating an example plot 48 of the total risk of false alarm and missed detection for the Toshiba Tecra M3 laptop computer in the presence of platform noise under the condition $C_{01}=0.8$, $C_{10}=1$, $P_0=P_1=\frac{1}{2}$, and SNR=20 dB. FIG. 6 shows that the total risk of false alarm and missed detection is minimized at an optimal threshold 0.74. Different values of $C_{01}$, $C_{10}$, $P_0$, $P_1$, SNR, and channel conditions will typically result in different optimal threshold values.

In practice, the false alarm probability curve will remain relatively constant during wireless device operation because the platform noise is usually relatively stable as long as clocks are not being turned on and off. For this reason, the false alarm probability curve can be updated infrequently. The missed detection probability curve, on the other hand, will typically change as either SNR or channel conditions change. If, for example, the total received signal power changes in a significant manner, a missed detection curve update may need to be performed. Thus, it can be difficult and costly to maintain an updated total risk curve within a wireless device. Therefore, some simplified approaches for determining a threshold value for use in packet detection operations have been developed in accordance with embodiments of the present invention. In a first approach, only false alarm rate is used to determine an appropriate threshold value. A false alarm rate versus threshold curve, like the one illustrated in FIG. 4, is first generated. A target false alarm rate is then selected for use by the wireless device. A threshold value is then selected from the curve that will achieve the target false alarm rate or better. Since platform noise is relatively stable, the threshold value may only need to be adjusted when something happens that may change the platform noise (e.g., an LCD clock is turned on, the channel changes, certain applications are executed, etc.).

Figure 7:
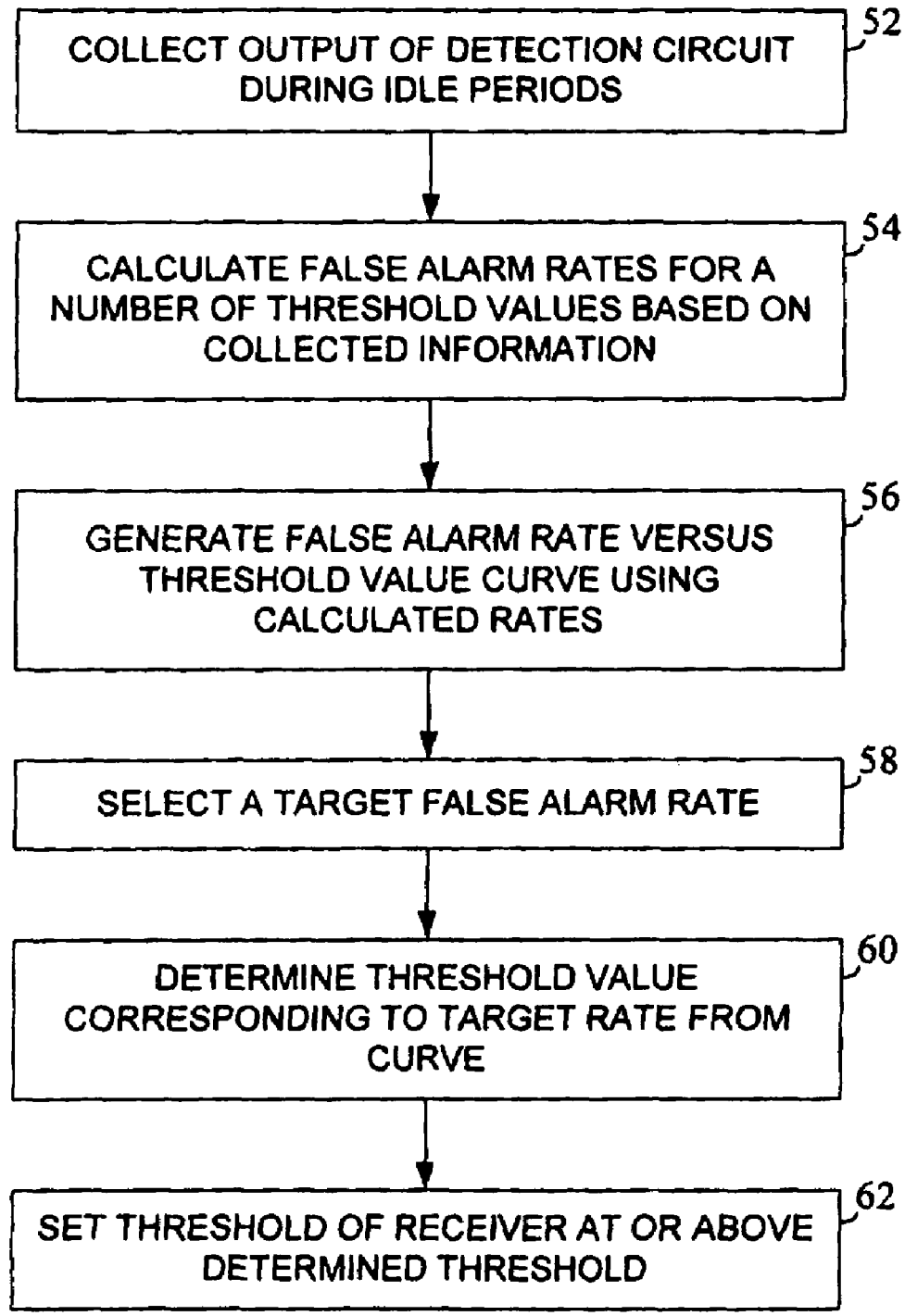
FIG. 7 is a flowchart illustrating an example method for use in performing threshold selection in the presence of platform noise in accordance with an embodiment of the present invention.

FIG. 7 is a flowchart illustrating an example method 50 for use in implementing the threshold selection approach described above in accordance with an embodiment of the present invention. In this approach, data is collected during idle periods (e.g., SIFS intervals in an IEEE 802.11 based network) to develop the false alarm versus threshold information. With reference to FIG. 7, the output of the detection circuit (e.g., auto-correlations coefficients, etc.) is collected during idle periods (block 52). For a number of different threshold values, false alarm rates may then be calculated using the collected information (block 54). A false alarm rate versus threshold curve may then be generated using the calculated false alarm rates (block 56). Interpolation may be used to generate the curve. A target false alarm rate is then selected (block 58). The target false alarm rate may be a maximum tolerable false alarm rate for the wireless device of interest. A threshold value corresponding to the target false alarm rate is then found from the curve (block 60). The threshold of the receiver is then set at or above the value found from the curve (a higher value will achieve a false alarm rate lower than the target rate) (block 62). Instead of selecting the threshold from the calculated curve, the threshold may be adjusted empirically, until the measured FA rate hits the target zone. If it is later determined that an event has occurred that may affect the platform noise, the above procedure may be repeated. For example, if it determined that an LCD pixel clock frequency has just been adjusted, the procedure may be repeated to find a new threshold value.

In at least one embodiment, a threshold value may be found and stored for each of a number of different platform noise scenarios. Then, when a particular scenario comes about, the appropriate value may be retrieved and used within the receiver. For example, if an LCD clock is typically turned on and off during operation of a particular wireless device, then a first threshold value may be determined and stored for situations where the LCD clock is on and a second threshold value may be determined for situations where the LCD clock is off. In this manner, a relatively constant false alarm rate may be maintained within the wireless device.

Figure 8:
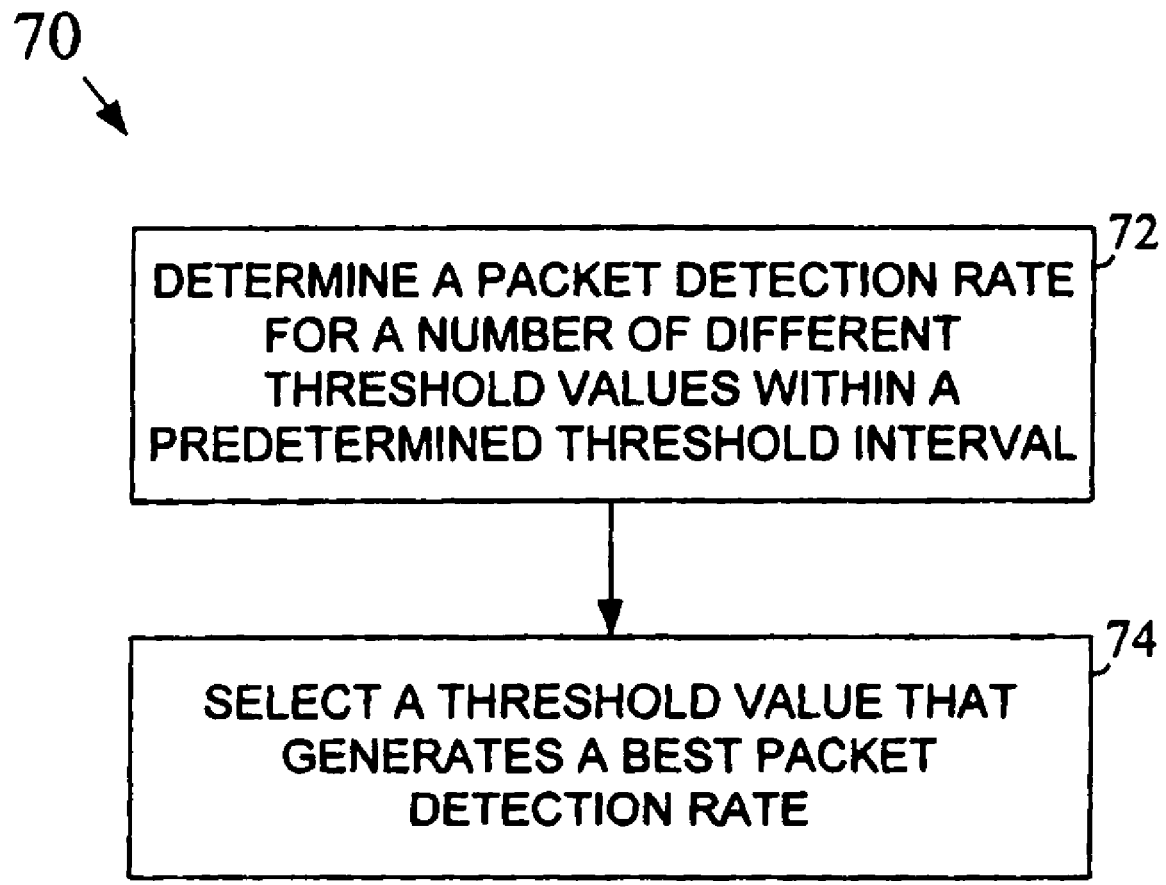
FIG. 8 is a flowchart illustrating a method for use in optimizing a threshold value based on both false alarm rate and missed detection rate in accordance with an embodiment of the present invention.

In the above-described technique, only false alarm rate is used to determine a threshold value for use during packet detection operations in a wireless device. In another simplified approach, both false alarm rate and missed detection rate are relied upon. The above-described technique may be used to determine a threshold value ($Th_{FA}$) that will achieve a target false alarm rate. The threshold value that achieves an optimal balance between false alarm rate and missed detection will typically be within a range between ($Th_{FA}-\delta$) and $Th_{FA}$, where $\delta$ is a small number that does not significantly affect the achieved false alarm rate. In this approach, this range of threshold values may be searched for a value that achieves an enhanced balance between false alarm rate and missed detection. FIG. 8 is a flowchart illustrating a method 70 for use in optimizing the threshold rate for both false alarm rate and missed detection rate. First, a packet detection rate is measured for a number of different threshold values within a predetermined threshold range (block 74). As described above, the threshold range may be the range between ($Th_{FA}-\delta$) and $Th_{FA}$, where $Th_{FA}$ may be determined using the method 50 of FIG. 7 (or a similar method). Once the packet detection rates have been determined, a threshold value is selected that maximizes the packet detection rate (block 74). Interpolation may or may not be used to generate a curve through the measured packet rate values before selection is performed.

A number of different techniques may be used to measure the packet detection rate, as described below. To determine the packet detection rate, the receiver must be able to know when a packet has been transmitted to it and not detected. The way this may be accomplished is by only using known packet sources during the measurement. Packets that may be used, for example, include beacons, clear-to-send (CTS) packets received in response to request-to-send (RTS) packets, acknowledgement (ACK) packets, etc. In one embodiment, for example, a wireless device may transmit an RTS packet to an access point (AP) to get the AP to return a CTS packet to the device. This may be repeated a number of times to get enough data to develop a packet detection rate for each of a number of threshold values within the predetermined threshold range (see block 74 of FIG. 8). The RTS may be sent using the most robust modulation and coding scheme available to guarantee that the RTS is properly received by the AP. A threshold value may then be selected that produces the highest packet detection rate. In a similar technique, the wireless device can transmit a series of "No Data" packets to the AP to get the AP to return corresponding ACK packets to the device. The device may then use the ACK packets to determine a packet detection rate for each of a number of threshold values within the predetermined threshold range.

In another technique for determining packet detection rates for threshold values within the predetermined range, a wireless device may, after wakeup, listen to the beacons transmitted by a corresponding AP. The wireless device will know when the beacons are to be transmitted and may therefore count which beacons were detected and which were not for each of the threshold values within the predetermined range. In still another approach, a wireless device may use communications between another wireless device and an AP to develop the packet detection information. For example, a wireless device may listen to the channel to determine when another wireless device has sent a packet to a corresponding AP. If the first wireless device is confident that there is a high likelihood (e.g., 90%) that the transmitted packet will reach the AP, the device may then see whether the ACK packet has been detected within its own receiver and use this information to develop packet detection rates. This may be repeated for each of the threshold values in the predetermined range and a threshold value may be selected that generates the largest packet detection rate. The packet detection rates generated by the wireless device using this approach may be divided by the estimated probability that the AP will receive the packet transmitted by the other wireless device in each particular case. Any of the above-described techniques, or a combination of the techniques, may be used to determine packet detections rates for a wireless device. Other techniques may alternatively be used.

Due to the non-linearity of the power amplifier (PA), low cost APs may transmit CTS and ACK packets using a lower order constellation with a higher transmission power and transmit data packets using a higher order constellation with a lower transmission power. This technique may be referred to as PA back off. In this technique is being used, the wireless device needs to reduce the searched threshold to compensate for the PA back off if the PA is likely to send data packets to it using a high order constellation.

In the above-described approaches, the packet detection performance was viewed in accordance with the binary hypothesis test In an alternative approach, the packet detection performance may be viewed based on achieved throughput. Generally, the maximization of throughput with respect to threshold will result in the minimization of the risk of false alarm and miss detection. Thus, in at least one embodiment of the present invention, the threshold may be adjusted to maximize throughput for a wireless device. For example, the threshold used in a wireless device may be set low initially and then be increased as throughput in monitored. The throughput will start to increase with threshold, but will reach a point where it then begins to drop. The value where it begins to drop may be taken as the optimum value. A potential problem with this approach is that the throughput may only have converged to a local maximum at the selected point, rather than a global maximum. This may require that the threshold be increased further past the initial drop in throughput. Using this throughput approach, it may be difficult or impossible to distinguish between throughput loss resulting from missed detection and throughput loss resulting from false alarm. Therefore, after the initial stage, the threshold may be both increased and decreased in order to determine the appropriate direction to increase the throughput.

In a wireless receiver that is subject to platform noise, a filter can typically be added to whiten the platform noise to improve packet detection performance. However, this approach is not always beneficial. For example, it will typically be more effective for narrower band noise than for spread clock or wide band noise. The adaptive packet detection metric may also be used in parallel with other techniques to reduce false alarm due to platform noise. Whether or not a filter and/or other metrics of packet detection techniques are used, the threshold searching techniques of the present invention may still be beneficially implemented. This is because the filter can be always treated as part of the channel and the packet detection metric only changes the way the false alarm rate and the missed detection rate are calculated.

The techniques and structures of the present invention may be implemented in any of a variety of different forms. For example, features of the invention may be embodied within laptop, palmtop, desktop, and tablet computers having wireless capability; personal digital assistants (PDAs) having wireless capability; cellular telephones and other handheld wireless communicators; pagers; satellite communicators; appliances having wireless capability; audio/video devices and multimedia devices having wireless capability; network interface cards (NICs) and other network interface structures; wireless base stations and access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu Ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

It should be appreciated that the individual blocks illustrated in the block diagrams herein may be functional in nature and do not necessarily correspond to discrete hardware elements. For example, in at least one embodiment, two or more of the blocks are implemented in software within a single (or multiple) digital processing device(s). The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method for use in a wireless device comprising:
   performing a correlation operation using a signal at an input of a wireless receiver to generate a correlation result;
   comparing said correlation result to a threshold value;
   making a packet arrival decision based on a result of said comparison; and
   occasionally updating said threshold value to enhance packet detection performance in the wireless receiver, wherein occasionally updating said threshold value includes determining a new threshold value to achieve a tradeoff between packet detection false alarm rate and missed packet detection rate within the wireless receiver;
   wherein determining a new threshold value to achieve a tradeoff between packet detection false alarm rate and missed packet detection rate within the wireless receiver includes:

determining a threshold value ($Th_{FA}$) that will achieve a target false alarm rate in said wireless receiver;

determining a threshold value range based on $Th_{FA}$; and searching said threshold value range for a value that achieves a best packet detection rate in the wireless receiver.

2. The method of claim 1, further comprising:

repeating performing, comparing, and making regularly during wireless receiver operation.

3. The method of claim 1, wherein:

occasionally updating said threshold value includes modifying said threshold value when one or more predetermined conditions change in the wireless receiver environment.

4. The method of claim 1, wherein:

occasionally updating said threshold value includes modifying said threshold value at predefined times during wireless receiver operation.

5. The method of claim 1, wherein:

occasionally updating said threshold value includes modifying said threshold value when a platform noise profile of a platform associated with said wireless receiver changes.

6. The method of claim 1, wherein:

occasionally updating said threshold value includes modifying said threshold value when one or more clocks associated with a corresponding wireless platform are turned on or off.

7. The method of claim 1, wherein:

occasionally updating said threshold value includes modifying said threshold value when changes are detected in a wireless channel associated with said wireless receiver.

8. The method of claim 1, wherein:

occasionally updating said threshold value includes modifying said threshold value when one or more predetermined applications are initiated within a corresponding platform.

9. The method of claim 1, wherein:

occasionally updating said threshold value includes determining a threshold value that will achieve a target packet detection false alarm rate within the wireless receiver.

10. The method of claim 9, wherein:

determining a threshold value that will achieve a target packet detection false alarm rate includes:

collecting data during idle periods of operation;

selecting a target false alarm rate for said wireless receiver;

using said collected data to determine a threshold value that will achieve said target false alarm rate in said wireless receiver.

11. The method of claim 1, wherein:

determining a threshold value range includes determining a range from ($Th_{FA}$-δ) to $Th_{FA}$, where δ is a small value that does not significantly affect achieved false alarm rate.

12. The method of claim 1, wherein:

searching said threshold value range includes measuring packet detection rate using packets known to have been transmitted in the wireless channel, wherein said packets known to have been transmitted include one or more of: beacon packets, clear-to-send (CTS) packets, and acknowledgement packets.

13. The method of claim 1, wherein:

occasionally updating said threshold value includes identifying a threshold value that maximizes measured throughput in a wireless channel between a remote transmitter and the wireless receiver.

14. An apparatus comprising:

a correlator to perform a correlation operation using a signal at an input of a wireless receiver to generate a correlation result;

a comparator to compare said correlation result to a threshold value for use in making a packet arrival decision; and a controller to vary said threshold value during receiver operation to improve packet detection performance in the wireless receiver, wherein said controller includes logic to update said threshold value to achieve a tradeoff between packet detection false alarm rate and missed packet detection rate within the wireless receiver;

wherein said logic to update said threshold value includes logic to:

determine a threshold value ($Th_{FA}$) that will achieve a target false alarm rate in said wireless receiver;

determine a threshold value range based on $Th_{FA}$; and search said threshold value range for a value that achieves a best packet detection rate in the wireless receiver.

15. The apparatus of claim 14, wherein:

said controller includes logic to determine a threshold value that will achieve a target packet detection false alarm rate in the wireless receiver.

16. The apparatus of claim 14, wherein:

said controller includes logic to determine a new threshold value when one or more predetermined conditions change in the wireless receiver environment.

17. The apparatus of claim 16, wherein:

said controller includes logic to monitor throughput in a wireless channel between a remote transmitter and the wireless receiver and logic to determine a threshold value that will maximize said throughput in said wireless channel.

18. The apparatus of claim 14, wherein:

determination of a threshold value range by said controller includes determination of a range from ($Th_{FA}$-δ) to $Th_{FA}$, where δ is a small value that does not significantly affect achieved false alarm rate.

19. The apparatus of claim 14, wherein:

searching said threshold value range by said controller includes measurement of a packet detection rate using packets known to have been transmitted in the wireless channel, wherein said packets known to have been transmitted include one or more of: beacon packets, clear-to-send (CTS) packets, and acknowledgement packets.

20. An article comprising a computer readable storage medium having instructions stored thereon that, when executed by a computing platform, operate to:

perform a correlation operation using a signal at an input of a wireless receiver to generate a correlation result;

compare said correlation result to a threshold value;

make a packet arrival decision based on a result of said comparison; and occasionally update said threshold value to improve packet detection performance in the wireless receiver, wherein said update operation includes operation to determine a new threshold value to achieve a tradeoff between packet detection false alarm rate and missed packet detection rate within the wireless receiver;

wherein said operation to determine a new threshold value to achieve a tradeoff between packet detection false alarm rate and missed packet detection rate within the wireless receiver includes operation to:

determine a threshold value ($Th_{FA}$) that will achieve a target false alarm rate in said wireless receiver;

determine a threshold value range based on $Th_{FA}$; and search said threshold value range for a value that achieves a best packet detection rate in the wireless receiver.

21. The article of claim 20, wherein said instructions further operate to:

perform, compare, and make a packet arrival decision repeatedly during wireless receiver operation.

22. The article of claim 20, wherein:

operation to occasionally update said threshold value includes operation to modify said threshold value when one or more predetermined conditions change in the wireless receiver environment.

23. The article of claim 22, wherein:

operation to occasionally update said threshold value includes operation to modify said threshold value at predefined times during wireless receiver operation.

24. The article of claim 22, wherein:

operation to occasionally update said threshold value includes operation to determine a threshold value that will achieve a target packet detection false alarm rate within the wireless receiver.

25. The article of claim 22, wherein:

operation to occasionally update said threshold value includes operation to identify a threshold value that maximizes measured throughput for a wireless channel between a remote transmitter and the wireless receiver.

26. The article of claim 20, wherein:

said operation to determine a threshold value range includes operation to determine a range from ($Th_{FA}$-δ) to $Th_{FA}$, where δ is a small value that does not significantly affect achieved false alarm rate.

27. The article of claim 20, wherein:

said operation to search said threshold value range includes operation to measure a packet detection rate using packets known to have been transmitted in the wireless channel, wherein said packets known to have been transmitted include one or more of: beacon packets, clear-to-send (CTS) packets, and acknowledgement packets.

28. A system comprising:

at least one dipole antenna;

a correlator to perform a correlation operation using a signal at an input of a wireless receiver to generate a correlation result;

a comparator to compare said correlation result to a threshold value for use in making a packet arrival decision; and a controller to vary said threshold value during receiver operation to improve packet detection performance in the wireless receiver, wherein said controller includes logic to update said threshold value to achieve a tradeoff between packet detection false alarm rate and missed packet detection rate within the wireless receiver;

wherein said logic to update said threshold value includes logic to:

determine a threshold value ($Th_{FA}$) that will achieve a target false alarm rate in said wireless receiver;

determine a threshold value range based on $Th_{FA}$; and search said threshold value range for a value that achieves a best packet detection rate in the wireless receiver.

29. The system of claim 28, wherein:

said controller includes logic to determine a threshold value that will achieve a target packet detection false alarm rate in the wireless receiver.

30. The system of claim 28, wherein:

determination of a threshold value range by said controller includes determination of a range from ($Th_{FA}$-δ) to $Th_{FA}$, where δ is a small value that does not significantly affect achieved false alarm rate.

\* \* \* \* \*

UNITED STATES PATENT AND TRADEMARK OFFICE
CERTIFICATE OF CORRECTION

PATENT NO. : 7,636,404 B2 Page 1 of 1
APPLICATION NO. : 11/322829
DATED : December 22, 2009
INVENTOR(S) : Guo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 992 days.

Signed and Sealed this

Twenty-first Day of December, 2010

David J. Kappos
*Director of the United States Patent and Trademark Office*